United States Patent
Voigt et al.

(10) Patent No.: US 11,710,893 B2
(45) Date of Patent: Jul. 25, 2023

(54) MODULAR RADIO FREQUENCY (RF) ANTENNA ASSEMBLIES

(71) Applicant: The Boeing Company, Chicago, IL (US)

(72) Inventors: Aaron N. Voigt, Kirkland, WA (US); Daniel J. Ellis, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/022,606

(22) Filed: Sep. 16, 2020

(65) Prior Publication Data

US 2020/0411970 A1 Dec. 31, 2020

Related U.S. Application Data

(63) Continuation of application No. 15/939,542, filed on Mar. 29, 2018, now abandoned.

(51) Int. Cl.
| | |
|---|---|
| *H01Q 1/28* | (2006.01) |
| *H01Q 1/22* | (2006.01) |
| *H04L 12/10* | (2006.01) |
| *H04B 1/3822* | (2015.01) |

(52) U.S. Cl.
CPC ............ *H01Q 1/28* (2013.01); *H01Q 1/2291* (2013.01); *H04B 1/3822* (2013.01); *H04L 12/10* (2013.01)

(58) Field of Classification Search
CPC ...... H01Q 1/28; H01Q 1/2291; H04B 1/3822; H04B 1/3888; H04L 12/10
See application file for complete search history.

(56) References Cited

U.S. PATENT DOCUMENTS

| | | | | |
|---|---|---|---|---|
| 6,005,700 | A | * 12/1999 | Pressler | H01Q 1/2258 340/687 |
| 2003/0190927 | A1 | 10/2003 | Leong et al. | |
| 2005/0216750 | A1 | 9/2005 | Bricher et al. | |
| 2014/0302888 | A1 | * 10/2014 | Syal | H04M 1/0256 455/552.1 |
| 2016/0270052 | A1 | * 9/2016 | Dame | H01Q 9/04 |
| 2018/0313877 | A1 | * 11/2018 | Brant | H01Q 1/36 |

* cited by examiner

*Primary Examiner* — Yuwen Pan
*Assistant Examiner* — Fatuma G Sherif
(74) *Attorney, Agent, or Firm* — Alston & Bird LLP

(57) ABSTRACT

Modular RF assemblies are described for radio networks. The modular RF assemblies include a number of replaceable elements for simplified maintenance and upgradability. In particular, the modular RF assemblies include a control assembly which includes electronics, an RF antenna assembly that includes one or more RF antennas, and a mounting plate. The RF antenna assembly is removably mounted to the control assembly, and the control assembly is removably mounted to the mounting plate. During a maintenance operation and/or an upgrade operation, the control assembly and/or the RF antenna assembly may be replaced to resolve a defective component, to modify the orientation or type of the one or more RF antennas, to change the type of wireless spectrum used for the radio network, etc.

20 Claims, 12 Drawing Sheets

MODULAR RADIO FREQUENCY (RF) ANTENNA ASSEMBLIES

CROSS REFERENCE TO RELATED APPLICATION

This application is a continuation of U.S. application Ser. No. 15/939,542, filed Mar. 29, 2018, the entire contents of which are incorporated herein by reference.

FIELD

This disclosure relates to the field of wireless networks and, in particular, to implementing radio networks onboard vehicles, such as aircraft.

BACKGROUND

The implementation of radio networks onboard aircraft has enabled new services such as enabling the aircraft crew and/or passengers to access the Internet on their Portable Electronic Devices (PEDS) while onboard, and/or utilizing their PEDS to access In-Flight Entertainment (IFE) options while onboard.

PEDs interface with the data network of the aircraft using a Wireless Local Area Network (WLAN). One example of a WLAN includes Wi-Fi, which commonly utilizes channels in the 2.4 GigaHertz (GHz) frequency band and/or in the 5 GHz frequency band. 2.4 GHz Wi-Fi provides a 20 MegaHertz (MHz) bandwidth per channel, with eleven total channels available worldwide due to per-country limitations. 5 GHz Wi-Fi provides a 20 MHz, 40 MHz, 80 MHz, or 160 MHz bandwidth per channel, with eighteen total channels available (mostly) worldwide due to per-country limitations.

WLANs on aircraft are typically implemented using standalone Line-Replaceable Units (LRUs) that are mounted in close proximity to their passive RF antennas with a length of coaxial cable between the LRUs and the RF antennas. Multiple LRUs may be installed in order to provide adequate wireless coverage across an aircraft, each requiring power and data connections. Further, the locations of the LRUs may not be optimal for wireless coverage but rather, be dictated by the accessibility to the aircraft data and power networks. In addition, the location and/or placement of the LRUs may prevent efficient maintenance and/or the installation of a new combination of LRUs and their associated RF antenna to support the normal evolution radio networks onboard aircraft. For example, to support new wireless frequencies and protocols, which are constantly evolving due to technological advancements.

It is therefore evident that the implementation of wireless networks onboard aircraft may be improved in order to reduce the effort associated with upgrading, repairing, and/or modifying WLAN installations onboard aircraft.

SUMMARY

Modular RF assemblies are described for radio networks. The modular RF assemblies include a number of replaceable components for simplified maintenance and upgradability. In particular, the modular RF assemblies include a control assembly which includes electronics, an RF antenna assembly that includes one or more RF antennas, and a mounting plate. The RF antenna assembly is removably mounted to the control assembly, and the control assembly is removably mounted to the mounting plate. During a maintenance operation and/or an upgrade operation, the control assembly and/or the RF antenna assembly may be replaced to resolve a defective component, to modify the orientation or type of the one or more RF antennas, to change the type of wireless spectrum used for the radio network, etc.

One embodiment comprises a modular RF assembly that includes mounting plate, a control assembly removably mounted to the mounting plate, and an RF antenna assembly removably mounted to the control assembly. The control assembly includes a first RF connector, an RF transceiver electrically coupled to the first RF connector, a processor communicatively coupled to the RF transceiver that directs the operation of the RF transceiver, and an interface. The interface communicatively couples the processor with a data network, and electrically couples the control assembly with a power system. The RF antenna assembly includes a second RF connector removably coupled to the first RF connector. The RF antenna assembly further includes at least one RF antenna electrically coupled to the second RF connector.

Another embodiment comprises a system that includes a modular RF assembly and a server. The modular RF assembly includes a mounting plate, a control assembly removably mounted to the mounting plate, and an RF antenna assembly removably mounted to the control assembly. The control assembly includes a first RF interface, an RF transceiver electrically coupled to the first RF interface, a processor, and a Power Over Ethernet (POE) interface. The processor is communicatively coupled to the RF receiver and directs operation of the RF receiver. The POE interface communicatively couples the processor with a POE data network, and electrically powers the control assembly. The RF antenna assembly includes a second RF interface and at least one RF antenna. The second RF interface is removably coupled to the first RF interface, and the at least one RF antenna is electrically coupled to the second RF interface. The server manages operation of at least one of the processor and the RF transceiver utilizing the POE data network.

Another embodiment comprises a system that implements a radio network. The system includes a POE data network, and a server that is communicatively coupled to the POE data network. The system further includes a modular RF assembly that includes a mounting plate, a control assembly removably mounted to the mounting plate, and an RF antenna assembly removably mounted to the control assembly. The control assembly includes a first RF interface, an RF transceiver electrically coupled to the first RF interface, and a processor communicatively coupled to the RF transceiver. The processor directs operation of the RF transceiver to implement the radio network based on communications form the server over the POE data network. The control assembly further includes a POE interface coupled to the POE data network the communicatively couples the processor with the server and electrically powers the RF transceiver. The RF antenna assembly includes a second RF interface removably coupled to the first RF interface. The RF antenna assembly further includes at least one RF antenna electrically coupled to the second RF interface.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
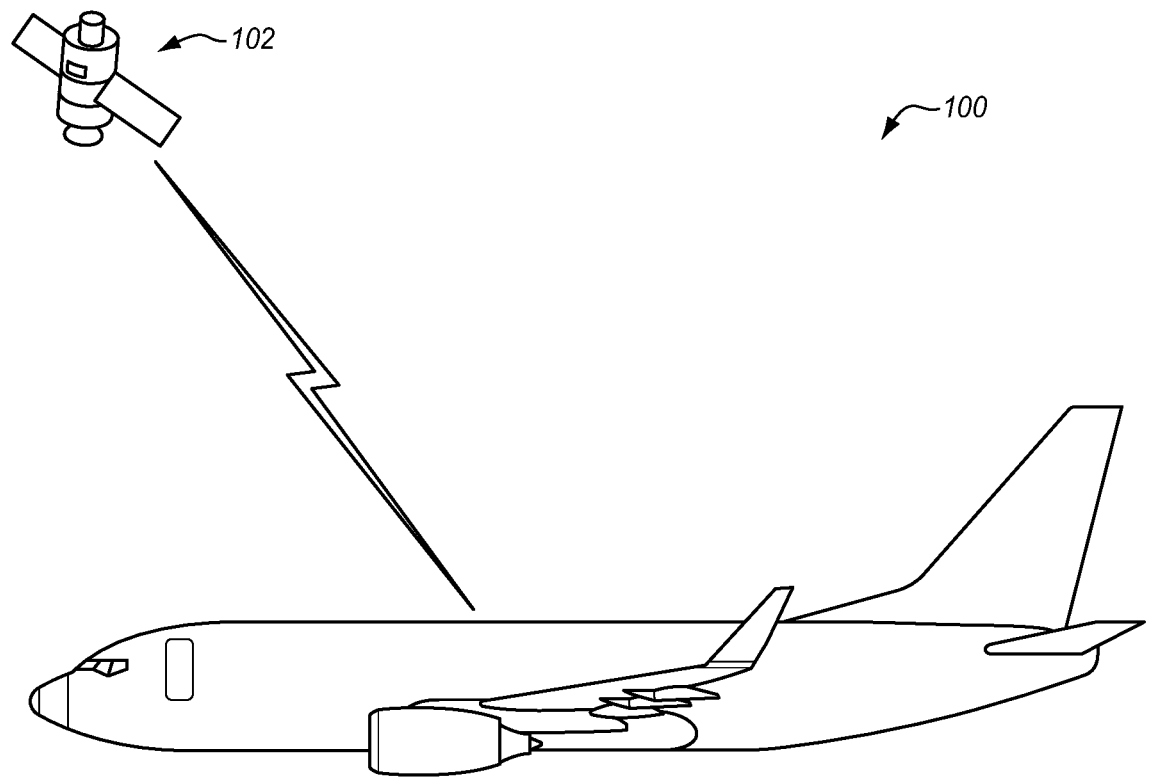
FIG. 1 is a view of an aircraft that implements one or more WLANs utilizing one or more modular RF assemblies in an illustrative embodiment.

FIG. 1 is a view of an aircraft 100 that implements one or more WLANs utilizing one or more modular RF assemblies (not shown in this view) for aircraft 100 in an illustrative embodiment. Aircraft 100 in this embodiment communicates with one or more satellite(s) 102 to provide communication capabilities to aircraft 100 and a remote data network. For example, an external antenna on aircraft 100 (not shown) may communicate with satellite(s) 102 to provide high speed bi-directional data services to aircraft 100 over the Ka-band, which covers frequencies from 26.5 GHz to 40 GHz. One example of a Ka-band data service that may be provided by satellite(s) 102 includes the Inmarsat Global Xpress (GX) program.

During flight, a WLAN onboard aircraft 100 may allow various aircraft systems onboard aircraft 100 (e.g., wireless sensors, not shown in FIG. 1) and aircraft crew and/or passengers access to a data network of aircraft 100 (not shown in FIG. 1). For example, wireless sensors onboard aircraft 100 may communicate with the data network of aircraft 100 over the WLAN to provide sensor data regarding the operation of aircraft 100. In another example, aircraft crew and/or passengers onboard aircraft 100 may utilize their PEDs to access the WLAN and connect to the Internet and/or receive IFE content from a media server (not shown in FIG. 1) onboard aircraft 100. A WLAN onboard aircraft 100 may be implemented with one or more RF antenna assemblies (not shown in FIG. 1) that are distributed within a cabin or cargo hold of aircraft 100.

Figure 2:
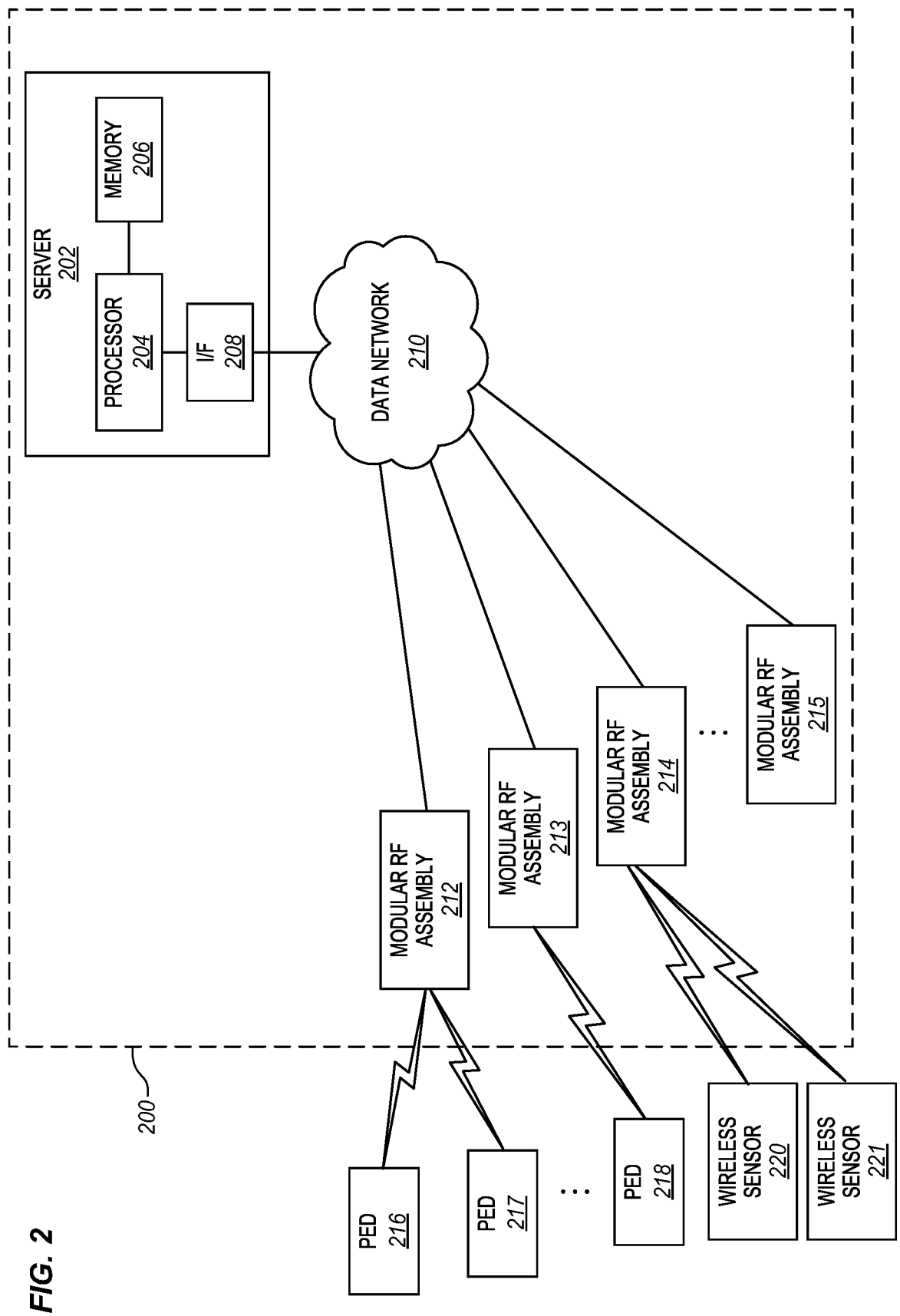
FIG. 2 is a block diagram of a content distribution and access system for the aircraft of FIG. 1 in an illustrative embodiment.

FIG. 2 is a block diagram of a content distribution and access system 200 in an illustrative embodiment. In this embodiment, system 200 includes a server 202, which may provide IFE content and/or access to the Internet to PEDs 216-218 utilizing one or more modular RF assemblies 212-215 that are communicatively coupled to server 202 via data network 210. Server 202 may also be used in some embodiments to modify the wireless capabilities and/or wireless settings of modular RF assemblies 212-215 and/or control modular RF assemblies 212-215. For instance, server 202 may control and/or vary an RF channel in use by one or more modular RF assemblies 212-215, may control and/or vary access point settings in use by one or more modular RF assemblies 212-215, may control or vary RF power levels in use by one or more modular RF assemblies 212-215, etc.

In the embodiments described herein, modular RF assemblies 212-215 comprise RF radio(s), control electronics, antenna(s), and mounting hardware in a modular format. The use of a modular format allows for simplified installation, upgrade, and maintenance of modular RF assemblies 212-215.

If server 202 is configured to distribute IFE content to PEDs 216-218, server 202 may distribute live content and/or pre-recorded content as desired. For example, to provide live content, server 202 may receive live content from satellite(s) 102, which allows server 202 to re-transmit the content (e.g., movies, television shows, advertisements, etc.) in real-time or near real-time to aircraft crew and/or passengers onboard aircraft 100. To provide pre-recorded content to aircraft crew and/or passengers onboard aircraft 100, server 202 may retrieve pre-recorded content (e.g., movies, television shows, advertisements, etc.) from a memory 206 of server 202. Server 202 may also provide access to the Internet to aircraft crew and/or passengers onboard aircraft 100 utilizing a bi-directional communication link to satellite(s) 102.

In some embodiments, one or more wireless sensors 220-221 may communicate with server 202 via modular RF assemblies 212-215 and data network 210 to provide sensor data regarding aircraft 100. For example, wireless sensors 220-221 may provide temperature information, vibration information, pressure information, etc. to server regarding aircraft 100. This information may be used to modify the operation of aircraft 100 and/or may be logged by server 202 for subsequent analysis. Server 202 may also forward the sensor data from wireless sensors 220-221 to a monitoring facility via satellite(s) 102.

While the specific hardware implementation of server 202 is subject to design choices, one particular embodiment may include one or more processors 204 coupled with memory 206. Processor 204 includes any hardware device that is able to perform functions. For example, processor 204 may provide IFE content streams to PEDs 216-218, may receive sensor data from wireless sensors 220-221, and/or may provide management functions for modular RF assemblies 212-215. Processor 204 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Memory 206 includes any hardware device that is able to store data. For instance, memory 206 may store IFE content and/or sensor data from wireless sensors 220-221. Memory 206 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

In this embodiment, server 202 also includes an interface (I/F) 208 which electrically couples server 202 to data network 210. I/F 208 includes any component, system, or device that is able to provide network signaling and network frame processing capabilities to server 202.

Data network 210 may include one or more switches, not shown, which route network frames between network enabled devices (e.g., modular RF assemblies 212-215 and server 202). For instance, if modular RF assemblies 212-215 are distributed across different sections of aircraft 100, then data network 210 may be implemented with one or more switches that distribute data network 210 to different portions of aircraft 100. Additional switches may provide additional bandwidth capability to a particular modular RF assembly 212-215 and/or may be wired to provide redundancy to a particular modular RF assembly 212-215. Although only one signaling path is illustrated between data network 210 and each of modular RF assemblies 212-215, a plurality of signaling paths may be provided to improve the data rate capabilities between server 202 and modular RF assemblies 212-215 and/or to provide redundancy in cases where a possible failure in a switch utilized to implement data network 210 fails.

Although the particular implementation of data network 210 is subject to design choices, one particular embodiment may implement data network 210 as an Ethernet network or as a Power Over Ethernet (POE) network. A POE network provides both power and data signaling over Ethernet cabling. POE may be useful when implementing system 200, as it allows modular RF assemblies 212-215 to both communicate with data network 210 and be electrically powered using the same Ethernet cable. The use of a common cable for both data and power provides more flexibility as to where modular RF assemblies 212-215 may be located within aircraft 100. For instance, POE cabling may be routed to locations within aircraft 100 that do not have access to an aircraft power system (not shown). Also, POE cabling may be routed to locations within aircraft 100 that are more ideal for implementing WLANs onboard aircraft 100.

Figure 3:
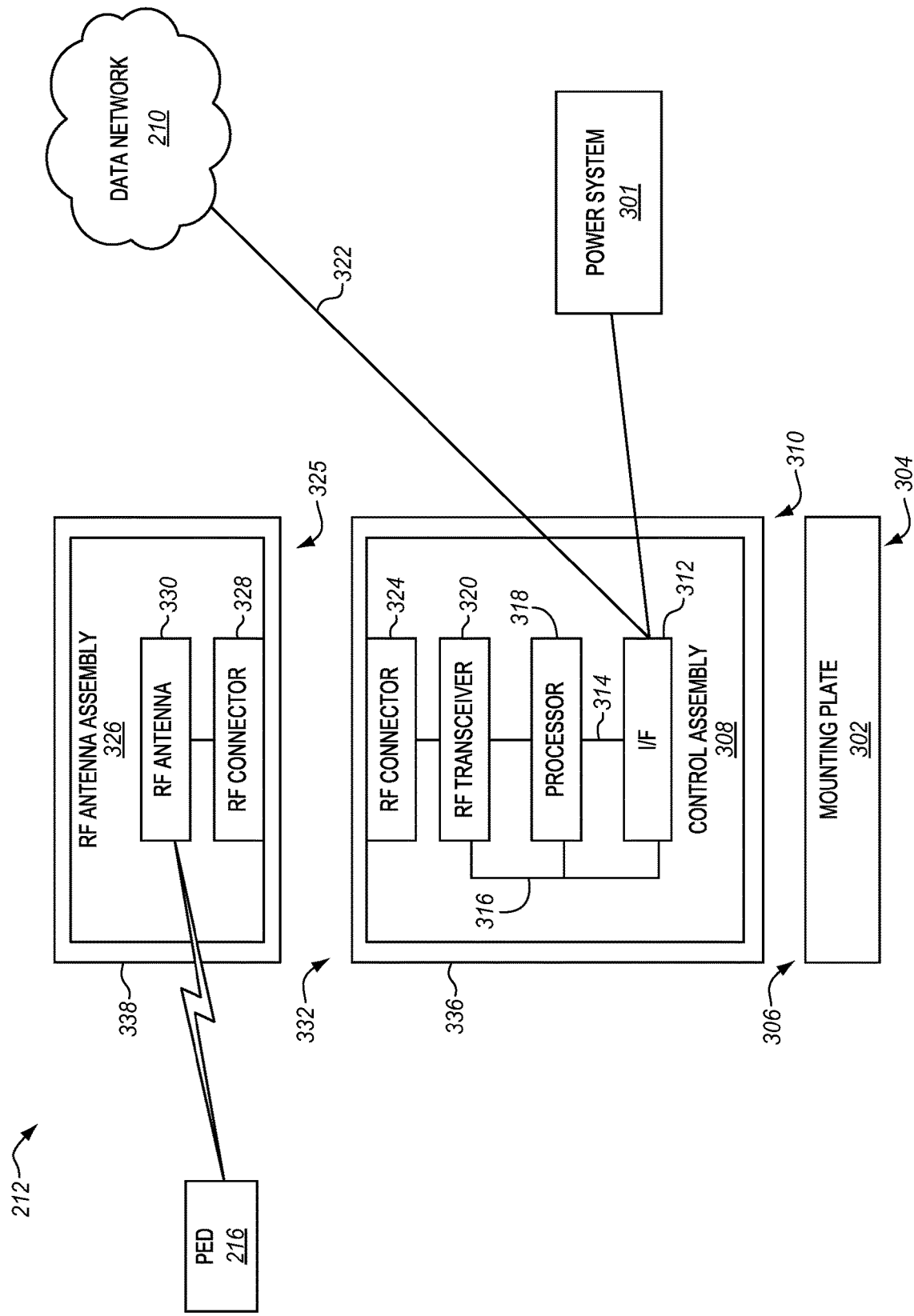
FIG. 3 is a block diagram of a modular RF assembly in an illustrative embodiment.

FIG. 3 is a block diagram of modular RF assembly 212 in an illustrative embodiment. In this embodiment, modular RF assembly 212 includes separate components. One component of modular RF assembly 212 comprises a mounting plate 302 having a surface 304 that mounts to aircraft 100. Another component of modular RF assembly 212 comprises a control assembly 308 having a surface 310 that mounts to a surface 306 of mounting plate 302. Surface 310 may be referred to as a first surface in some embodiments. Another component of modular RF assembly 212 comprises an RF antenna assembly 326 having a surface 325 that mounts to a surface 332 of control assembly 308. In some embodiments, surface 325 may be referred to as a third surface.

Mounting plate 302 provides a common mounting interface to control assembly 308, thereby allowing control assembly 308 to be removably mounted to aircraft 100. Various mounting methods are supported to ensure that mounting plate 302 may be positioned and mounted within aircraft 100 as desired. For instance, surface 310 and/or surface 306 may include interlocking features (not shown) which allows control assembly 308 to be removably mounted to mounting plate 302. Such features may include snaps, clasps, bands, removable screws, etc.

Control assembly 308 includes electronics and one or more radios for implementing a WLAN onboard aircraft 100, while RF antenna assembly 326 includes one or more passive antennas that broadcast the signals generated by control assembly 308.

In this embodiment, control assembly 308 includes an interface (I/F) 312, which communicatively couples a processor 318 of control assembly 308 with data network 210. I/F 312 also electrically couples control assembly 308 with power system 301 of aircraft 100.

I/F 312 includes any component, system, or device that is able to provide data communications 314 and electrical power 316 to control assembly 308. In some embodiments, I/F 312 may include separate electrical connections to provide data communications 314 and electrical power 316 to control assembly 308. For example, I/F 312 may comprise a network connector coupled to data network 210, and a separate electrical connector coupled to a power system 301 of aircraft 100. However, in some embodiments I/F 312 includes an Ethernet connection that provides both data communications 314 and electrical power 316 over the same Ethernet cable (e.g., POE). This simplifies the data and power distribution complexity for installing modular RF assembly 212 onto aircraft 100.

In this embodiment, processor 318 is communicatively coupled to an RF transceiver 320 and is configured to direct operation of RF transceiver 320. For instance, processor 318 may provide commands to RF transceiver 320 to manage an RF channel in use by RF transceiver 320, an access point setting for RF transceiver 320, and/or an RF power level of RF transceiver 320. Processor 318 may perform this operation based on communications received from server 202 over data network 210. Processor 318 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Control assembly 308 in this embodiment further includes an RF connector 324, which is communicatively coupled to RF transceiver 320. RF connector 324 may be referred to as a first RF connector or a first RF interface in some embodiments. RF connector 324 comprises any component or device that is capable of transmitting high bandwidth electrical signals (e.g., 1-100 GHz).

In this embodiment, RF antenna assembly 326 of modular RF assembly 212 is configured to removably mount to control assembly 308. In particular, when RF antenna assembly 326 is mounted to control assembly 308, RF connector 324 of control assembly 308 mates with and is electrically coupled to an RF connector 328 of RF antenna assembly 326. RF connector 328 may be referred to as a second RF connector or a second RF interface in some embodiments. RF connector 328 comprises any component or device that is capable of transmitting high bandwidth electrical signals (e.g., 1-100 GHz).

RF antenna assembly 326 further includes at least one RF antenna 330, which is electrically coupled to RF connector 328. RF antenna 330 is configured to convert electrical signals generated by RF transceiver 320 into RF signals. RF antenna 330 is further configured to convert RF signals received from PEDs 216-218 and/or wireless sensors 220-221 into electrical signals that are provided to RF transceiver 320.

When control assembly 308 and RF antenna assembly 326 are mounted together, electrical signals generated by RF transceiver 320 are electrically coupled to RF antenna 330 via RF connector 324 and RF connector 328. In particular, a surface 322 of control assembly 308 may be configured to removably mount to surface 325 of RF antenna assembly 326. In some embodiments, surface 332 may be referred to as a second surface.

In some embodiments, RF connector 324 is proximate to surface 332 and aligned with RF connector 328 when RF antenna assembly 326 is mounted to control assembly 308. Surface 332 and/or surface 325 may include interlocking features (not shown) which allows RF antenna assembly 326 to be removably mounted to control assembly 308. Such features may include snaps, clasps, bands, removable screws, etc.

As discussed previously, mounting plate 302, control assembly 308, and RF antenna assembly 326 are separate components that can be removably mounted together. In this regard, control assembly 308 includes an enclosure 336, which houses RF connector 324, RF transceiver 320, processor 318, and I/F 312. RF antenna assembly 326 includes an enclosure 338, which houses RF antenna 330 and RF connector 328. In some embodiments, enclosure 336 may be referred to as a first enclosure, while enclosure 338 may be referred to a second enclosure.

The modular nature of modular RF assembly 212 allows for more efficient maintenance and upgrades for aircraft 100. For example, RF antenna assembly 326 may be removed from control assembly 308 and replaced with a different unit having a different RF antenna configuration. This may be desirable to change the RF performance of modular RF assembly 212. In another example, control assembly 308 may be removed from mounting plate 302 and RF antenna assembly 326 and replaced with a different unit having an upgraded RF transceiver. Replacing RF transceiver 320 may be used to allow modular RF assembly 212 to operate at a different RF frequency and/or to support a different wireless standard.

From a maintenance perspective, RF antenna assembly 326 may be removed from control assembly 308 and replaced with a different unit if RF antenna assembly 326 is damaged. If control assembly 308 becomes defective in some way, control assembly 308 may be removed from mounting plate 302 and RF antenna assembly 326 and replaced with a working control assembly. The replicable aspect of the components of modular RF assembly 212 therefore improve the efficiency of repair operations and provide a simplified way to upgrade the wireless network capabilities provided to aircraft crew and/or passengers onboard aircraft 100.

Figure 4:
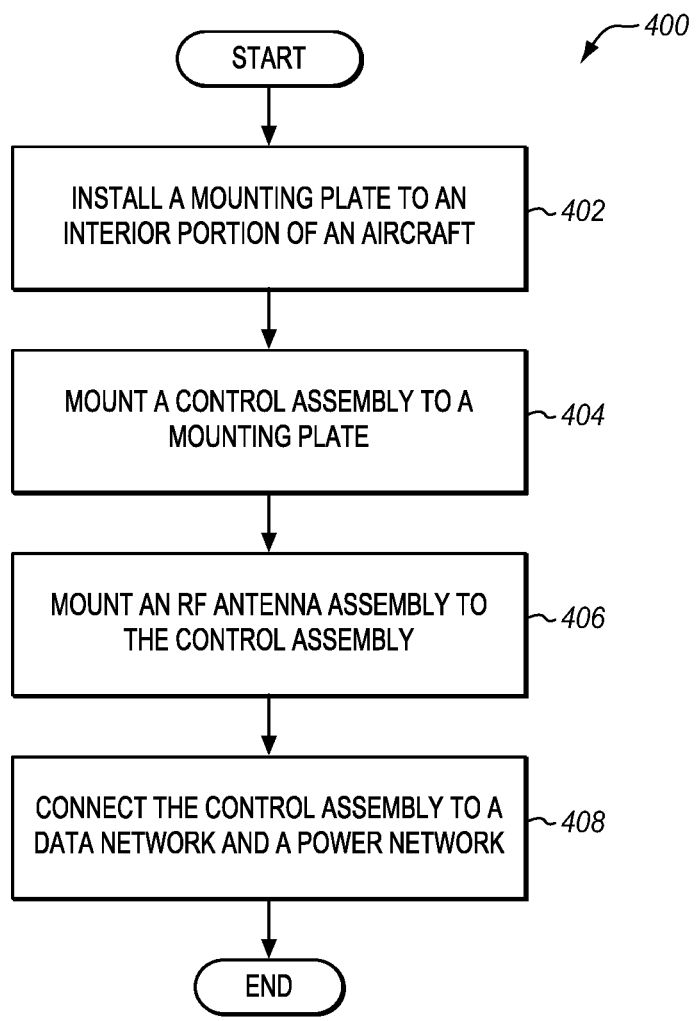
FIG. 4 is a flow chart of a method of installing a modular RF assembly in an illustrative embodiment.

FIG. 4 is a flow chart of a method 400 of installing a modular RF assembly in an illustrative embodiment. Method 400 will be discussed with respect to modular RF assembly 212 of FIG. 3, although method 400 and other methods described herein may apply to other modular RF assemblies not shown. The steps of method 400 and other methods described herein may be performed in an alternate order, and/or may include other steps that are not explicitly shown.

Figure 5:
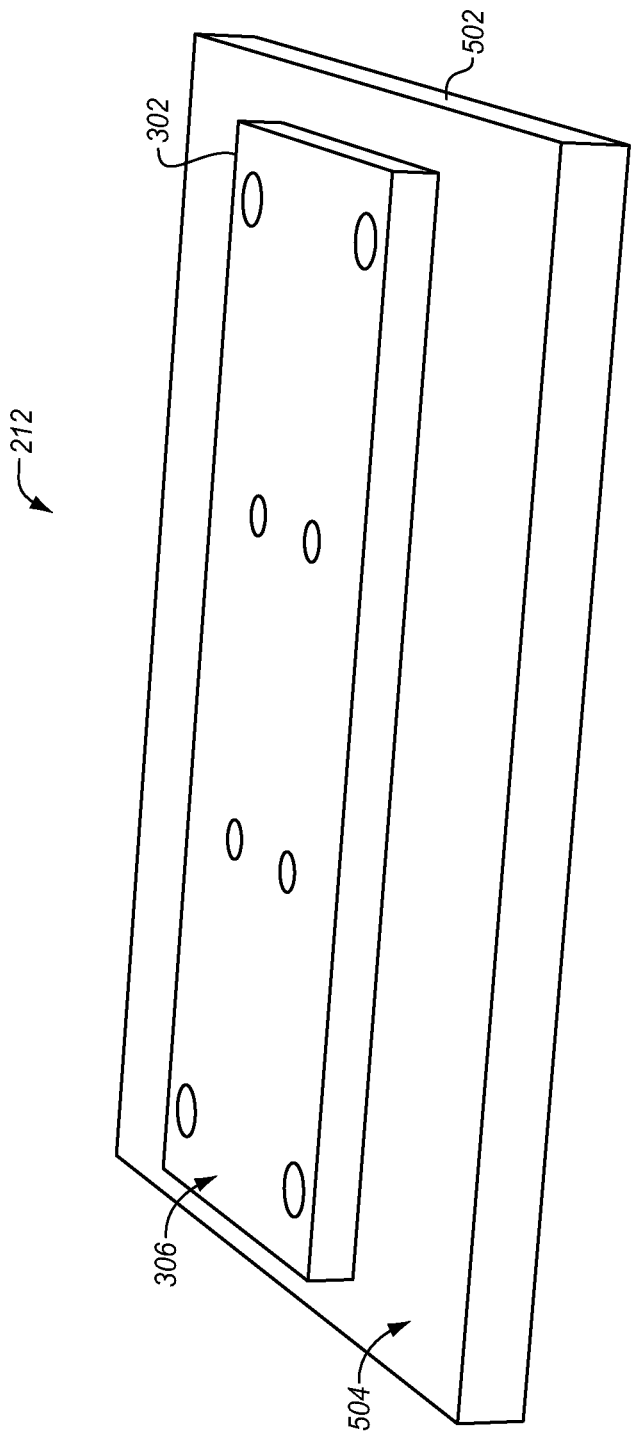
FIG. 5 illustrates a mounting plate attached to an interior portion of an aircraft in an illustrative embodiment.

Step 402 of method 400 comprises installing mounting plate 302 to an interior portion of aircraft 100. For instance, during a retrofit operation for aircraft 100, interior locations within aircraft 100 may be identified for installing modular RF assembly 212 based on a desired wireless coverage area at the locations. After ensuring or providing access at the locations for data and power connections, an installer secures mounting plate 302 to one of the locations. FIG. 5 illustrates mounting plate 302 attached to an interior portion 502 of aircraft 100 in an illustrative embodiment. For instance, interior portion 502 may comprise a portion of an interior passageway of aircraft 100, a crown location of an interior doorway, etc. In FIG. 5, surface 306 of mounting plate 302 is disposed away from an exterior surface 504 of interior portion 502 of aircraft, and surface 304 of mounting plate 302 is disposed toward exterior surface 504.

Figure 6:
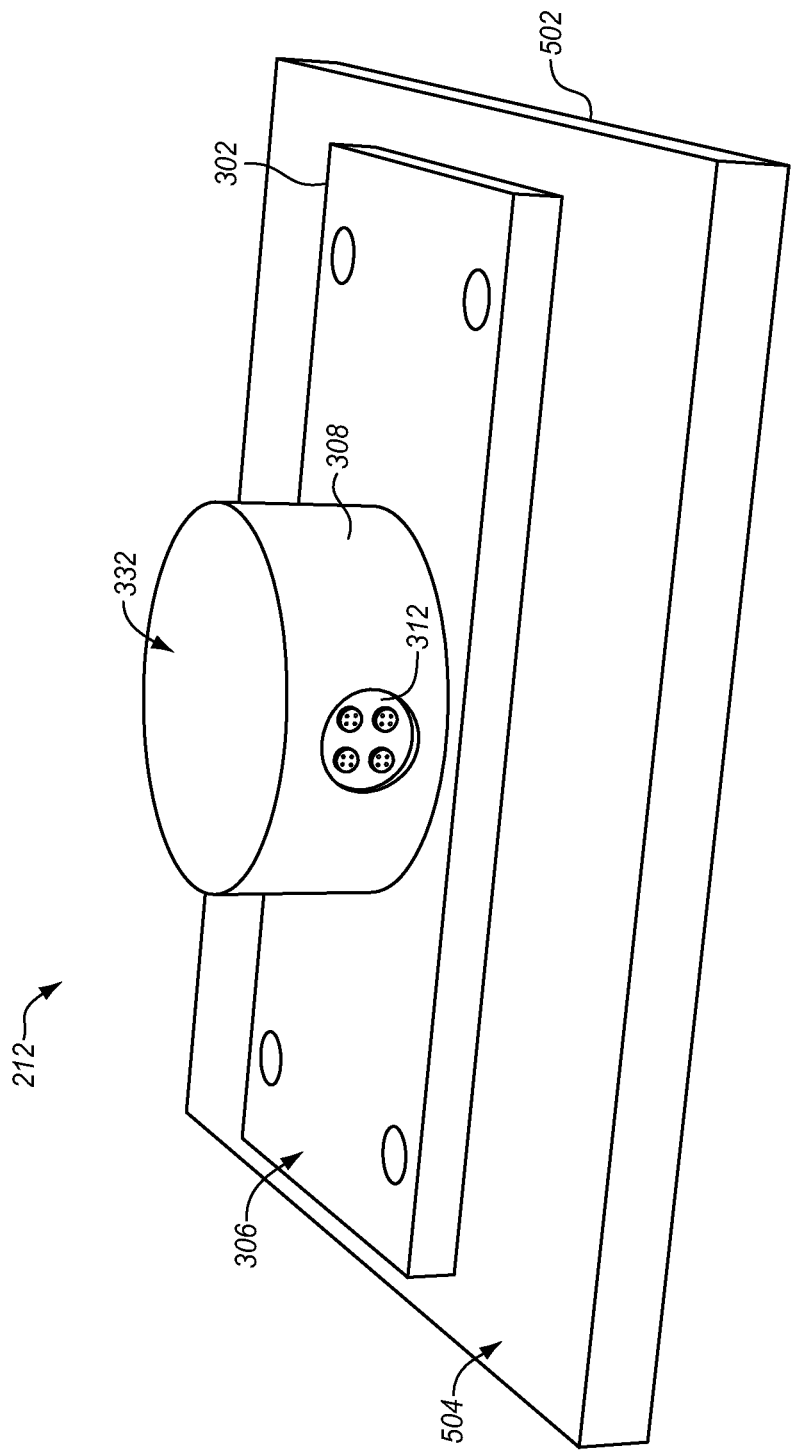
FIG. 6 illustrates a control assembly attached to a surface of the mounting plate of FIG. 5 in an illustrative embodiment.

Step 404 of method 400 comprises mounting control assembly 308 to mounting plate 302. FIG. 6 illustrates control assembly 308 attached to surface 306 of mounting plate 302 in an illustrative embodiment. In FIG. 6, surface 332 of control assembly 308 is disposed away from mounting plate 302, and surface 310 of control assembly 308 is disposed towards surface 306 of mounting plate 302.

Figure 7:
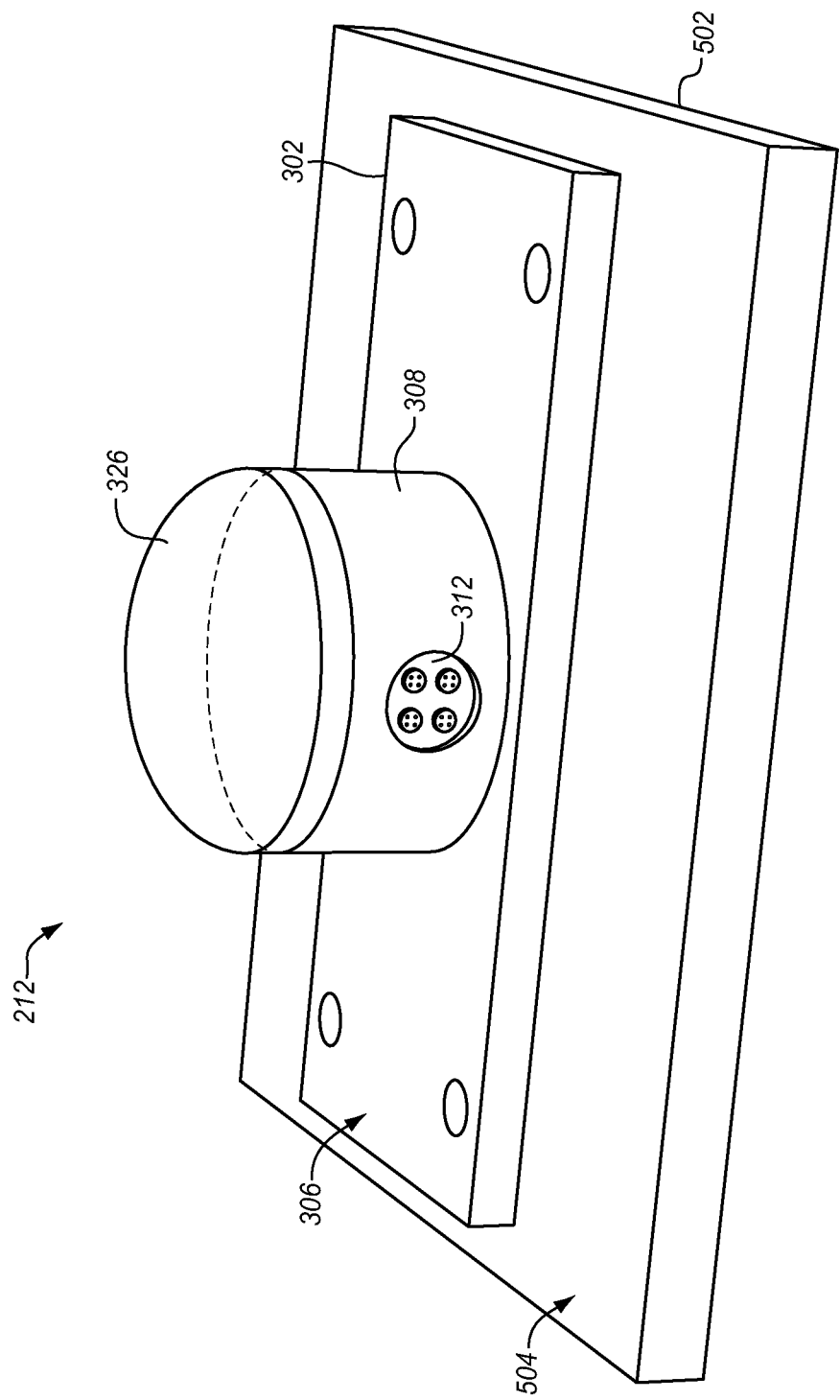
FIG. 7 illustrates an RF antenna assembly attached to a surface of the control assembly of FIG. 6 in an illustrative embodiment.

Step 406 of method 400 comprises mounting RF antenna assembly 326 to control assembly 308. When RF antenna assembly 326 is mounted to control assembly 308, RF connector 328 at RF antenna assembly mates with RF connector 324 of control assembly (see FIG. 3). FIG. 7 illustrates RF antenna assembly 326 attached to surface 332 of control assembly 308 in an illustrative embodiment. In FIG. 7, surface 325 of RF antenna assembly 326 is disposed towards surface 332 of control assembly 308.

Step 408 of method 400 comprises connecting control assembly 308 to a data network and a power network. For instance, I/F 312 may be connected to data network 210 and power system 301 (see FIGS. 2-3). If I/F 312 utilizes POE, then connecting data network 210 and power system 301 to control assembly 308 may be performed by connecting I/F 312 to an Ethernet cable that carries both data and electrical power.

Figure 8:
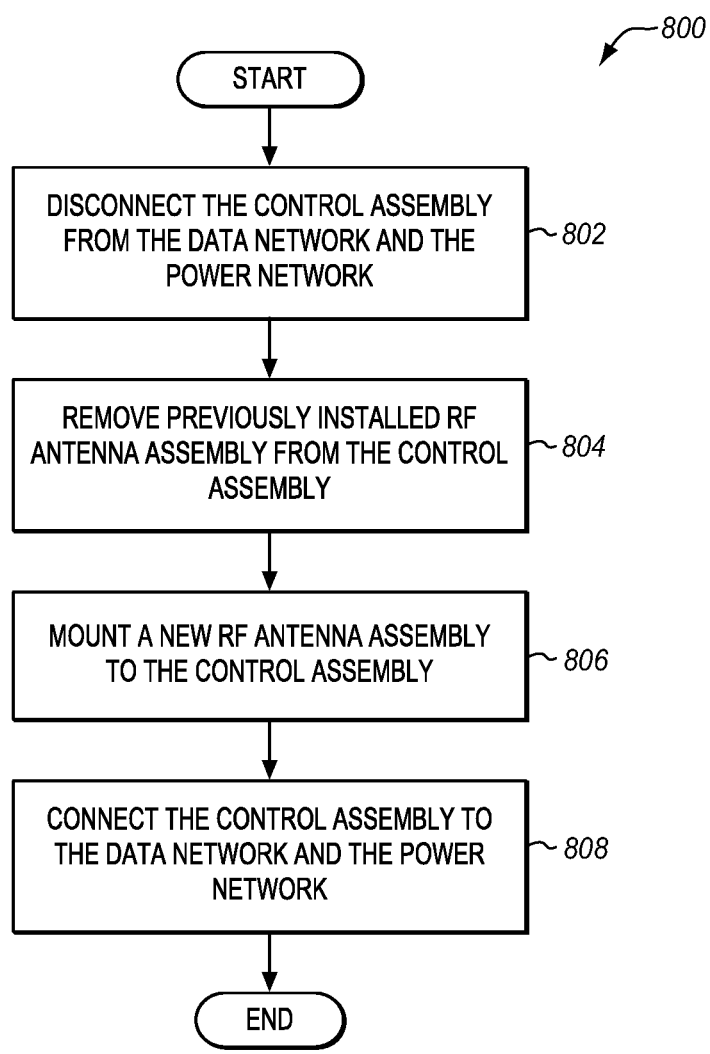
FIG. 8 is a flow chart of a method of replacing a component of a modular RF assembly in an illustrative embodiment.

In some cases, a component of modular RF assembly may be replaced. For instance, RF antenna assembly 326 may be replaced to change the type and/or number of passive antennas in modular RF assembly 212. FIG. 8 is a flow chart of a method 800 of replacing a component of modular RF assembly 212 in an illustrative embodiment.

Consider that modular RF assembly 212 is installed in aircraft 100, as illustrated in FIG. 7. A maintenance worker locates modular RF assembly 212 and disconnects the control assembly 308 from data network 210 and power system 301 (see step 802). The maintenance work removes the previously installed RF antenna assembly 326 from control assembly 308 (see FIG. 6 and step 804 of FIG. 8). The maintenance worker installs a new RF antenna assembly to the control assembly 308 (see step 806).

Figure 9:
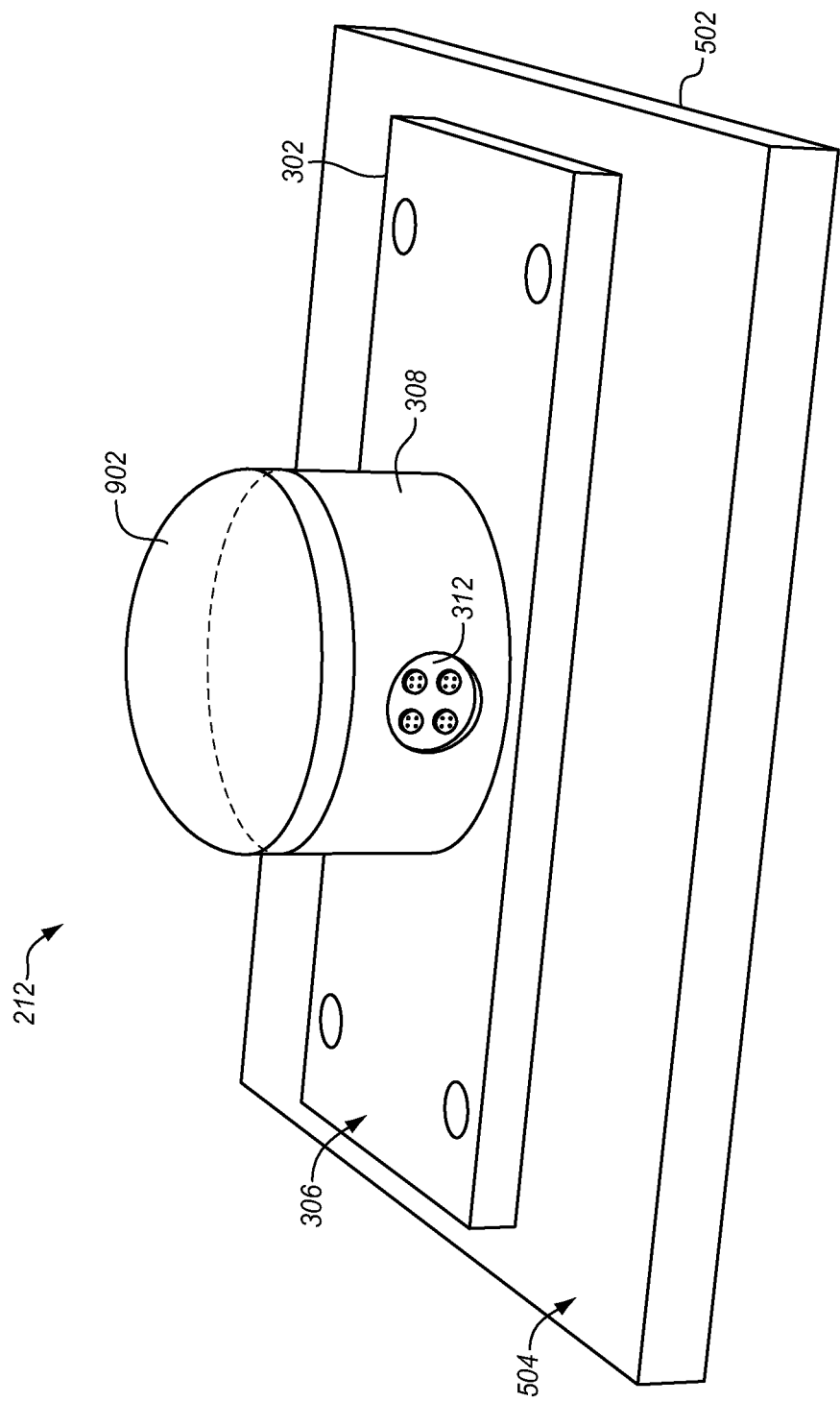
FIG. 9 illustrates the result of installing a new RF antenna assembly to a control assembly in an illustrative embodiment.

FIG. 9 illustrates the result of installing a new RF antenna assembly 902 to control assembly 308 in an illustrative embodiment. After installation of new RF antenna assembly 902, the maintenance worker connects control assembly 308 to data network 210 and power system 301 using I/F/ 312 (see step 808).

In some cases, it may be desirable to replace control assembly 308 after installation of modular RF assembly 212.

For instance, to upgrade RF transceiver 320 in order to support different RF frequencies, RF power levels, protocols, etc.

Figure 10:
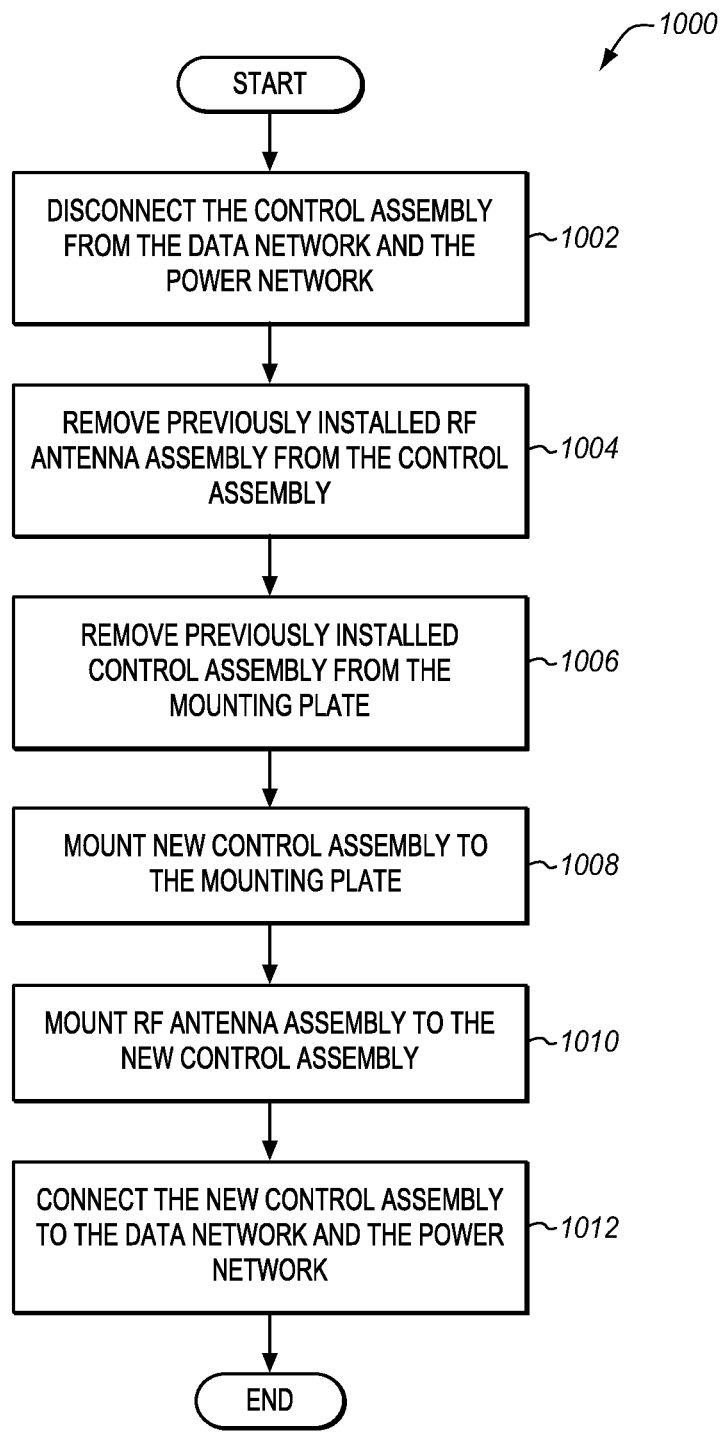
FIG. 10 is a flow chart of another method of replacing a component of a modular RF assembly in an illustrative embodiment.

FIG. 10 is a flow chart of another method 1000 of replacing a component of modular RF assembly 212 in an illustrative embodiment. Consider that modular RF assembly 212 is installed in aircraft 100, as illustrated in FIG. 7. A maintenance worker locates modular RF assembly 212 and disconnects the control assembly 308 from data network 210 and power system 301 (see step 1002). The maintenance work removes the previously installed RF antenna assembly 326 from control assembly 308 (see FIG. 6 and step 1004 of FIG. 10). The maintenance worker then removes the control assembly 308 from mounting plate 302 (see FIG. 5 and step 1006 of FIG. 10). The maintenance worker installs a new control assembly to mounting plate 302 (see step 1008 of FIG. 10).

Figure 11:
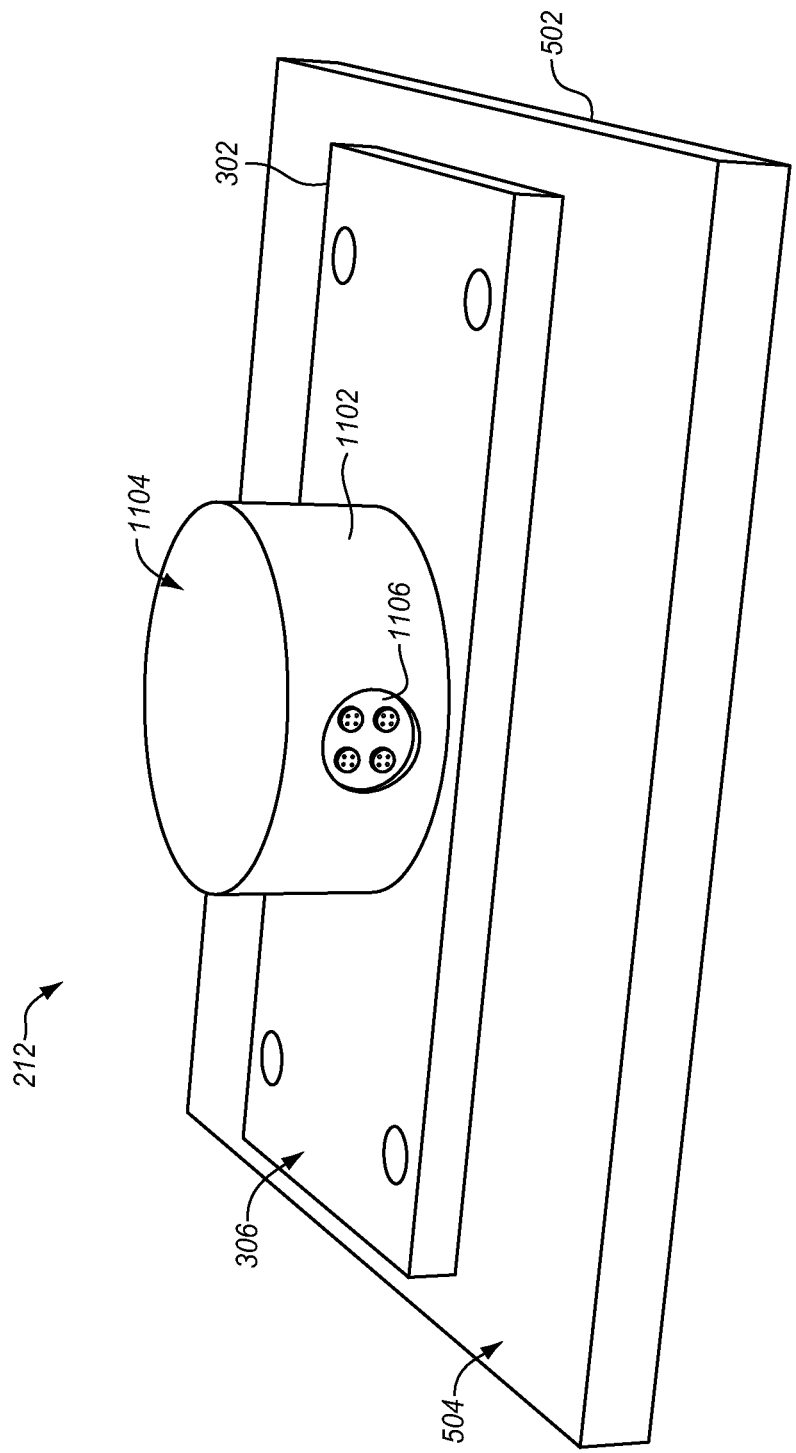
FIG. 11 illustrates the result of mounting a new control assembly to a mounting plate in an illustrative embodiment.

FIG. 11 illustrates the result of mounting a new control assembly 1102 to mounting plate 302 in an illustrative embodiment. New control assembly 1102 includes an I/F 1106, which may be similar in function to I/F 312 previously described, and a surface 1104 that mounts to RF antenna assembly 326.

Figure 12:
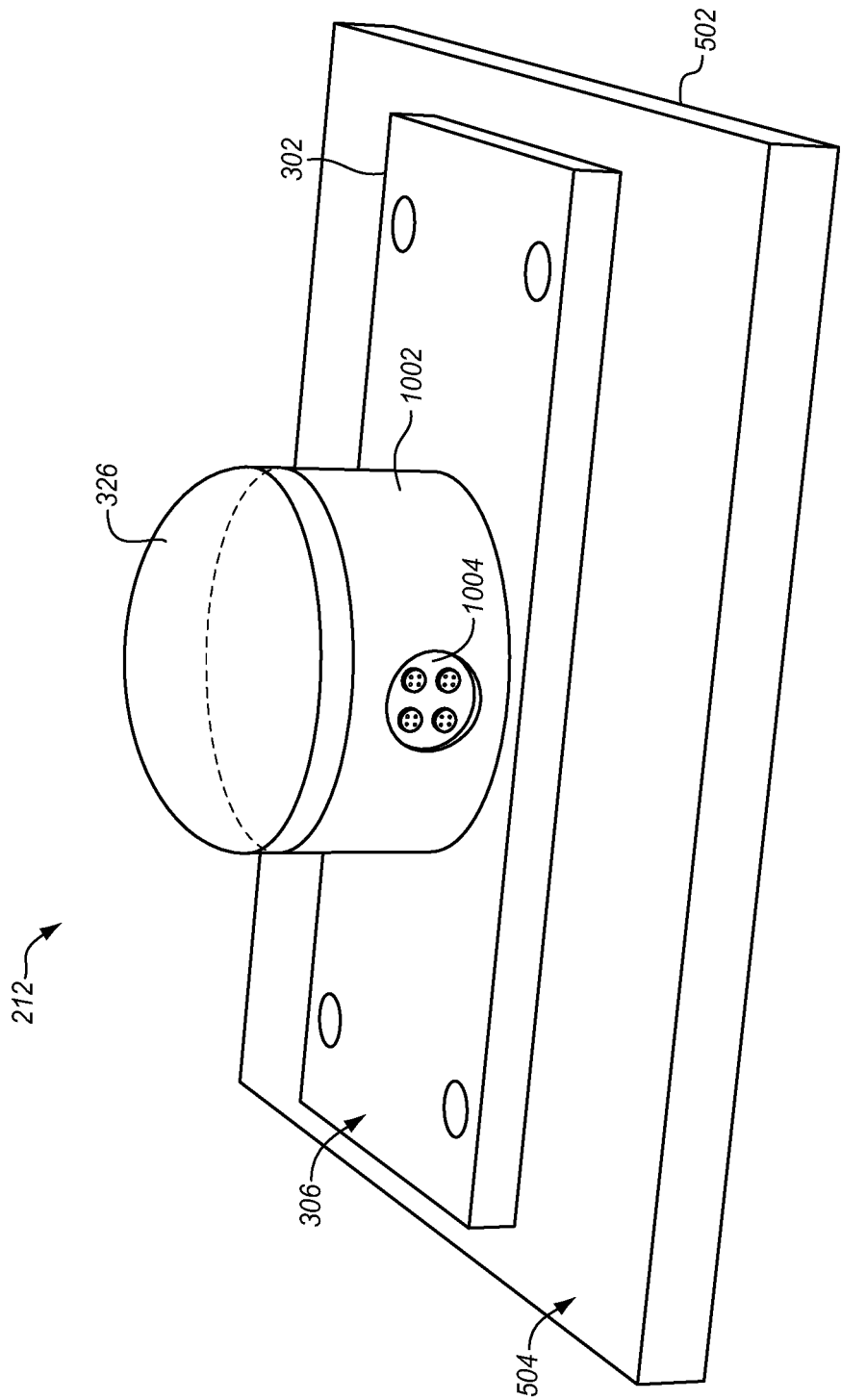
FIG. 12 illustrates the result of re-installing an RF antenna assembly onto a new control assembly in an illustrative embodiment.

In step 1010, the maintenance worker installs an RF antenna assembly. In some embodiments, RF antenna assembly 326 (see FIG. 7) may be reused. However, if the RF characteristics of new control assembly 1102 are different from control assembly 308, then a different RF antenna assembly may be installed that has different passive RF antennas as compared to RF antenna assembly 326. Assume for this example that RF antenna assembly 326 will be reused. FIG. 12 illustrates the result of re-installing RF antenna assembly 326 onto new control assembly 1102 in an illustrative embodiment. After installation of RF antenna assembly 326, the maintenance worker connects new control assembly 1102 to data network 210 and power system 301 utilizing I/F 1106 (see step 1012).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A modular Radio Frequency (RF) assembly, comprising:
   a mounting plate having a first surface configured to mount to an interior portion of an aircraft and a second surface opposing the first surface;
   a control assembly including:
      a control assembly enclosure removably mounted to the mounting plate, the control assembly enclosure having a third surface to removably mount to the second surface of the mounting plate, and a fourth surface opposing the third surface;
      a first RF connector disposed proximate to the fourth surface of the control assembly enclosure;
      an RF transceiver electrically coupled to the first RF connector;
      an interface partially within the control assembly enclosure configured to selectively couple the processor communicatively with a data network of the aircraft, and to selectively couple the control assembly electrically with a power system of the aircraft; and
      a processor communicatively coupled to the RF transceiver and configured to direct operation of the RF transceiver, wherein the first RF connector, the RF transceiver and the processor are disposed within the control assembly enclosure; and
   an RF antenna assembly including:
      an RF antenna assembly enclosure removably mounted to the fourth surface of the control assembly enclosure, opposite the mounting plate;
      a second RF connector removably coupled to the first RF connector; and
      at least one RF antenna electrically coupled to the second RF connector, wherein the second RF connector and the at least one RF antenna are disposed within the RF antenna assembly enclosure.

2. The modular RF assembly of claim 1, wherein at least one of the third surface of the control assembly enclosure or the second surface of the mounting plate comprises interlocking features to removably mount the control assembly enclosure to the mounting plate.

3. The modular RF assembly of claim 1, wherein:
   the first RF connector is aligned at the fourth surface of the control assembly enclosure to removably mate to the second RF connector in response to mounting the RF antenna assembly to the control assembly.

4. The modular RF assembly of claim 1, wherein the RF antenna assembly enclosure comprises opposed fifth and sixth surfaces, and wherein the RF antenna assembly enclosure is removably mounted to the control assembly enclosure such that the fifth surface of the RF antenna assembly enclosure faces the fourth surface of the control assembly enclosure and the sixth surface of the RF antenna assembly enclosure faces away from the control assembly enclosure.

5. The modular RF assembly of claim 4, wherein at least one of the fourth surface of the control assembly enclosure or the fifth surface of the RF antenna assembly enclosure comprises interlocking features to removably mount the control assembly enclosure to the RF antenna assembly enclosure.

6. The modular RF assembly of claim 1, wherein:
the interface comprises a Power Over Ethernet (POE) interface configured to communicatively couple the processor with a POE data network.

7. The modular RF assembly of claim 6, wherein at least one of an RF channel, an access point setting, or an RF power level of the RF transceiver are managed with the control assembly over the POE data network.

8. The modular RF assembly of claim 1, wherein the control assembly enclosure is removably mounted to the mounting plate using one or more of snaps, clasps, bands, or screws.

9. A system, comprising:
a modular Radio Frequency (RF) assembly, comprising:
  a mounting plate having a first surface configured to mount to an interior portion of an aircraft and a second surface opposing the first surface;
  a control assembly including:
    a control assembly enclosure removably mounted to the mounting plate, the control assembly enclosure having a third surface to removably mount to the second surface of the mounting plate, and a fourth surface opposing the third surface;
    a first RF connector disposed proximate to the fourth surface of the control assembly enclosure;
    an RF transceiver electrically coupled to the first RF connector, wherein the first RF connector and the RF transceiver are disposed within the control assembly enclosure; and
    an interface configured to communicatively couple the control assembly with a data network, and to electrically couple the control assembly with a power system; and
  an RF antenna assembly including:
    an RF antenna assembly enclosure removably mounted to the fourth surface of the control assembly enclosure, opposite the mounting plate;
    a second RF connector removably coupled to the first RF connector; and
    at least one RF antenna electrically coupled to the second RF connector, wherein the second RF connector and the at least one RF antenna are disposed within the RF antenna assembly enclosure; and
a server configured to manage operation of the control assembly utilizing the data network.

10. The system of claim 9, wherein:
the server is configured to manage an access point setting of the RF transceiver utilizing communications to the control assembly over the data network.

11. The system of claim 9, wherein:
the server is configured to manage an RF power level of the RF transceiver utilizing communications to the control assembly over the data network.

12. The system of claim 9, wherein:
the server is configured to manage an RF channel of the RF transceiver utilizing communications to the control assembly over the data network.

13. The system of claim 9, wherein the control assembly enclosure is removably mounted to the mounting plate such that the third surface of the control assembly enclosure faces the mounting plate and the fourth surface of the control assembly enclosure faces away from the mounting plate.

14. The system of claim 13, wherein at least one of the third surface of the control assembly enclosure or the mounting plate comprises interlocking features to removably mount the control assembly enclosure to the mounting plate.

15. The system of claim 13, wherein:
the first RF connector is disposed proximate to the fourth surface of the control assembly enclosure and aligned at the fourth surface of the control assembly enclosure to removably mate to the second RF connector in response to mounting the RF antenna assembly to the control assembly.

16. The system of claim 13, wherein the RF antenna assembly enclosure comprises opposed fifth and sixth surfaces, and wherein the RF antenna assembly enclosure is removably mounted to the control assembly enclosure such that the fifth surface of the RF antenna assembly enclosure faces the fourth surface of the control assembly enclosure and the sixth surface of the RF antenna assembly enclosure faces away from the control assembly enclosure.

17. The system of claim 16, wherein at least one of the fourth surface of the control assembly enclosure or the fifth surface of the RF antenna assembly enclosure comprises interlocking features to removably mount the control assembly enclosure to the RF antenna assembly enclosure.

18. A method for assembly of a modular Radio Frequency (RF) system comprising:
removably mounting a control assembly enclosure to a mounting plate, the mounting plate having a first surface configured to mount to an interior portion of an aircraft and a second surface opposing the first surface;
enclosing, within the control assembly enclosure, a first RF connector, an RF transceiver, and a processor, wherein the RF transceiver is electrically coupled to the first RF connector, and the processor is communicatively coupled to the RF transceiver, the control assembly enclosure having a third surface to removably mount to the second surface of the mounting plate, and a fourth surface opposing the third surface, the first RF connector disposed proximate to the fourth surface of the control assembly enclosure;
enclosing, within an RF antenna assembly enclosure, a second RF connector and at least one RF antenna;
removably mounting the RF antenna assembly enclosure to the fourth surface of the control assembly enclosure, opposite the mounting plate; and
removably coupling the first RF connector to the second RF connector.

19. The method of claim 18, wherein removably mounting the control assembly enclosure to the mounting plate comprises removably mounting the control assembly enclosure to the second surface of the mounting plate such that the third surface of the control assembly enclosure faces the mounting plate, and the fourth surface of the control assembly enclosure opposite the third surface of the control assembly enclosure faces away from the mounting plate.

20. The method of claim 19, wherein removably mounting the RF antenna assembly enclosure to the control assembly enclosure comprises removably mounting the RF antenna assembly enclosure to the second surface of the control assembly enclosure.

* * * * *